United States Patent [19]

Chiu

[11] Patent Number: 5,509,725
[45] Date of Patent: Apr. 23, 1996

[54] WHEEL COVER ASSEMBLY FOR MOTOR VEHICLES

[75] Inventor: Mexa Chiu, Taipei, Taiwan

[73] Assignee: Mexa Co., LTD., Taipei, Taiwan

[21] Appl. No.: 341,950

[22] Filed: Nov. 16, 1994

[51] Int. Cl.⁶ .................................................. B60B 7/10
[52] U.S. Cl. .................................. 301/37.36; 301/37.36
[58] Field of Search .............................. 301/37.1, 37.24, 301/37.31, 37.32, 37.34, 37.35, 37.36, 37.42

[56] References Cited

U.S. PATENT DOCUMENTS

| | | | |
|---|---|---|---|
| 2,926,955 | 3/1960 | Zyon | 301/37.36 X |
| 2,927,824 | 3/1960 | Simon | 301/37.34 |
| 3,036,867 | 5/1962 | Lyon | 301/37.34 |
| 3,746,397 | 7/1973 | Buerger | 301/37.1 |
| 5,366,278 | 11/1994 | Brumfield | 301/37.36 X |

*Primary Examiner*—Russell D. Stormer
*Attorney, Agent, or Firm*—Jacobson, Price, Holman, & Stern

[57] ABSTRACT

A wheel assembly including a wheel having a recessed wall portion at an outer side and a smoothly curved peripheral wall portion around the recessed wall portion, a wheel cover having a plurality of sliding grooves radially disposed at an inner side and a plurality of locating blocks by the sliding grooves, the locating blocks defining with the wheel cover a respective receiving chamber, and a plurality of clamps fastened to the wheel and the wheel cover to hold them together, each clamp having one end hooked on the peripheral wall portion of the wheel and an opposite end inserted through one sliding groove into the corresponding receiving chamber.

6 Claims, 5 Drawing Sheets

WHEEL COVER ASSEMBLY FOR MOTOR VEHICLES

BACKGROUND OF THE INVENTION

The present invention relates to an improved structure of wheel assembly comprised of a wheel and a wheel cover fastened to the wheel by clamps, wherein the wheel cover has a plurality of sliding grooves radially disposed at an inner side, and a plurality of locating blocks positioned behind the sliding grooves, the locating blocks defining with the wheel cover a respective receiving chamber; each clamp have one end hooked on the wheel and an opposite end inserted through one sliding grooves into the corresponding receiving chamber.

The wheel of a motor vehicle is generally covered with a wheel cover. Conventionally, the wheel cover is fastened to the wheel by metal or plastic hook means. Recently, steel wire rings are commonly used to fasten wheel covers to wheels. When a steel wire spring is used, it is fastened to a recessed wall portion at an outer side of the wheel to hold down the wheel cover. However, because the wheels vary with the models of the motor vehicles, different steel wire rings and other metal or plastic fittings or fastening devices shall be used for different wheels. Furthermore, if a wheel has no recessed wall portion or similar structure for loading a steel wire ring, then metal or plastic hooks and steel wire rings are useless other additional metal or plastic plastic fittings or fastening devices must be used to fasten the wheel cover. When additional fittings or fastening devices are provided, the packing and transportation cost of wheel covers is relatively increased. Furthermore, the tooling apparatus for making conventional plastic wheel covers are complicated, thereby causing the manufacturing cost of the wheel covers unable to be reduced to a satisfactory level.

SUMMARY OF THE INVENTION

It is one object of the present invention to provide a wheel cover which is suitable for a mass production, thereby the manufacturing cost is low. It is another object of the present invention to provide a wheel cover which is suitable for fastening to any of a variety of wheels. It is another object of the present invention to provide a wheel cover which is integrally molded from plastics, thereby the packing and transportation cost is low.

According to the present invention, the wheel assembly is comprised of a wheel and a wheel cover fastened to the wheel by clamps. The wheel cover has a plurality of sliding grooves radially disposed at an inner side, and a plurality of locating blocks positioned behind the sliding grooves, the locating blocks defining with the wheel cover a respective receiving chamber. Each clamp comprises a hooked portion at one end hooked on the wheel, a bent at an opposite end fitting a beveled tail on one locating block, and a curved body portion connected between the hooked portion and received in a receiving chamber defined between one locating block and the wheel cover. The curved body portion fits the sloping bottom wall portion of one locating block when the respective clamp is installed.

DETAILED DESCRIPTION OF THE PREFERRED EMBODIMENT

Figure 1:
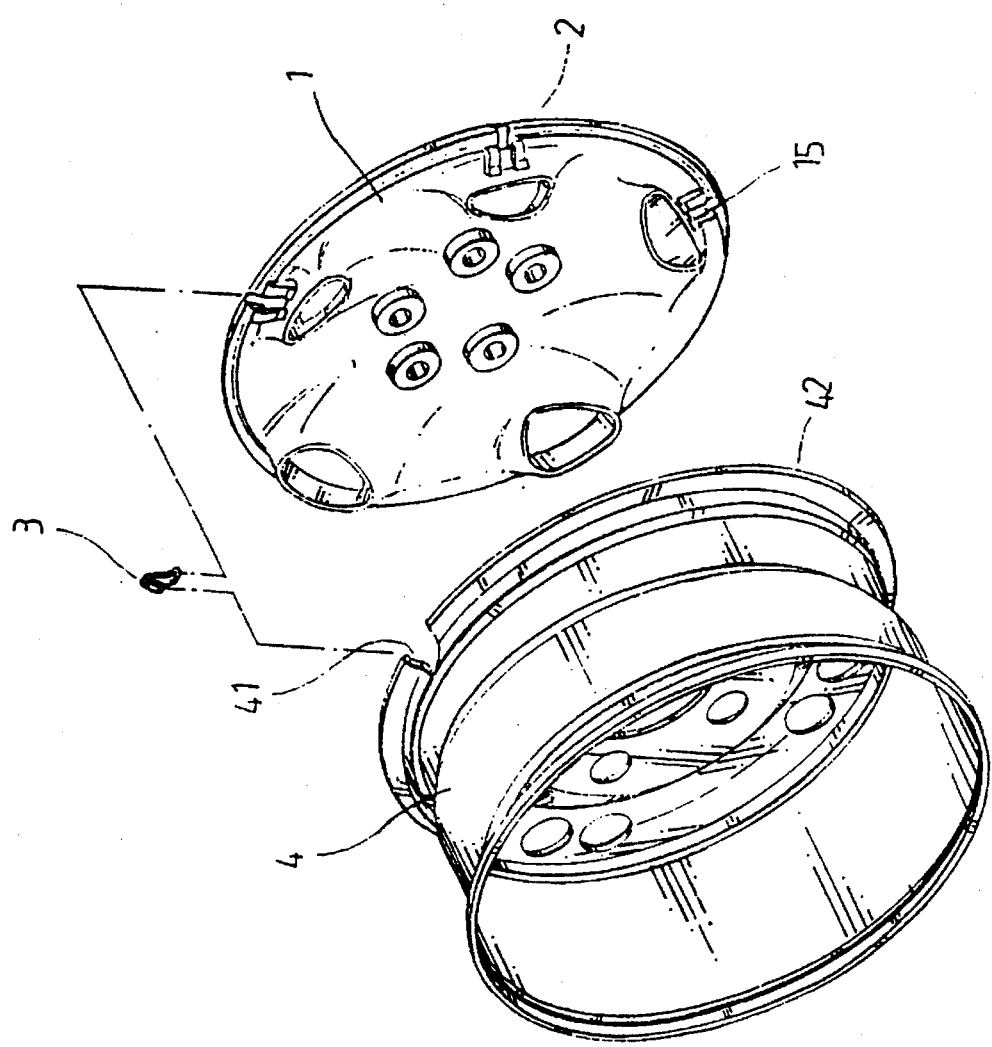
FIG. 1 is an exploded view of a wheel assembly according to the present invention.

Referring to FIG. 1, a wheel assembly in accordance with the present invention is generally comprised of a wheel cover 1, a plurality of locating blocks 2, a plurality of clamps 3, and a wheel 4.

Figure 2:
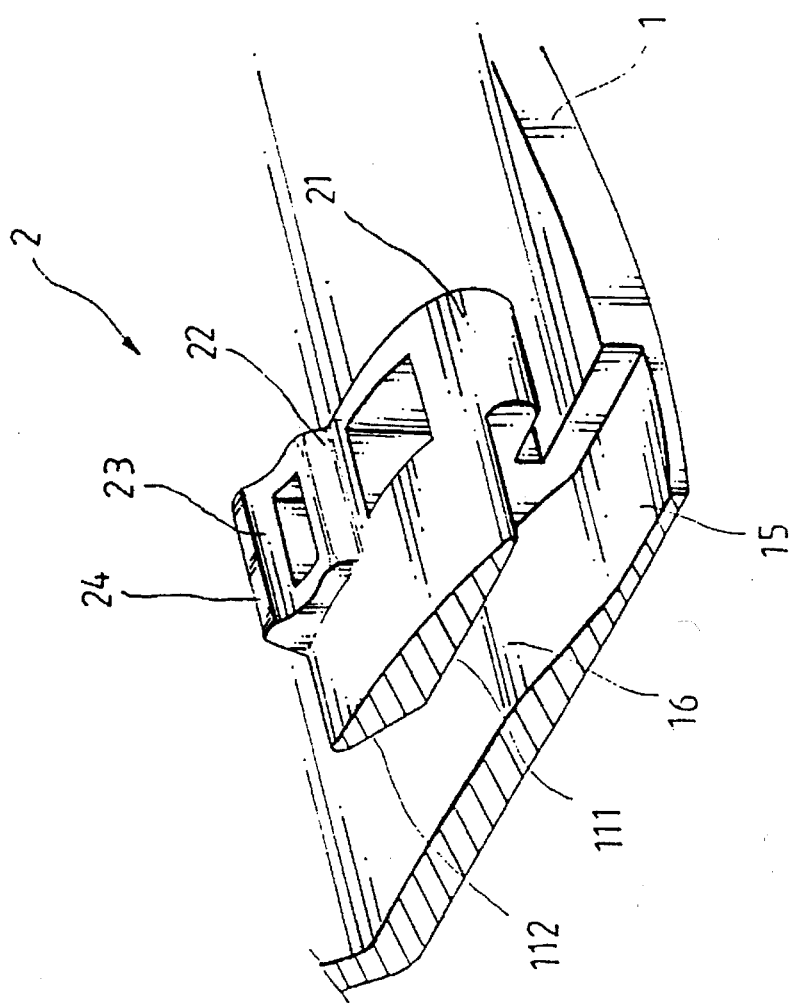
FIG. 2 is a cutaway in an enlarged scale of the wheel cover shown in FIG. 1.

Referring to FIGS. 1 and 2, the wheel cover 1 is integrally molded from plastics, having a plurality of sliding grooves 15 radially disposed at the inner side thereof and a plurality of locating blocks 2 raised from the inner side and respectively disposed behind the sliding grooves 15. The locating blocks 2 define with the inner side of the wheel cover 1 a respective receiving chamber 16 in alignment with one sliding groove 15 for receiving one clamp 3, which is fastened to the corresponding sliding groove 15 to retain the wheel cover 1 to the wheel 4. The wheel 4 has a conventional shape with a recessed wall portion 41 at an outer side for receiving the locating blocks 2 of the wheel cover 1, and a smoothly curved peripheral wall portion 42 around the recessed wall portion 41 for mounting the clamps 3, permitting wheel cover 1 to be fastened to the wheel 4 by the clamps 3.

Figure 4:
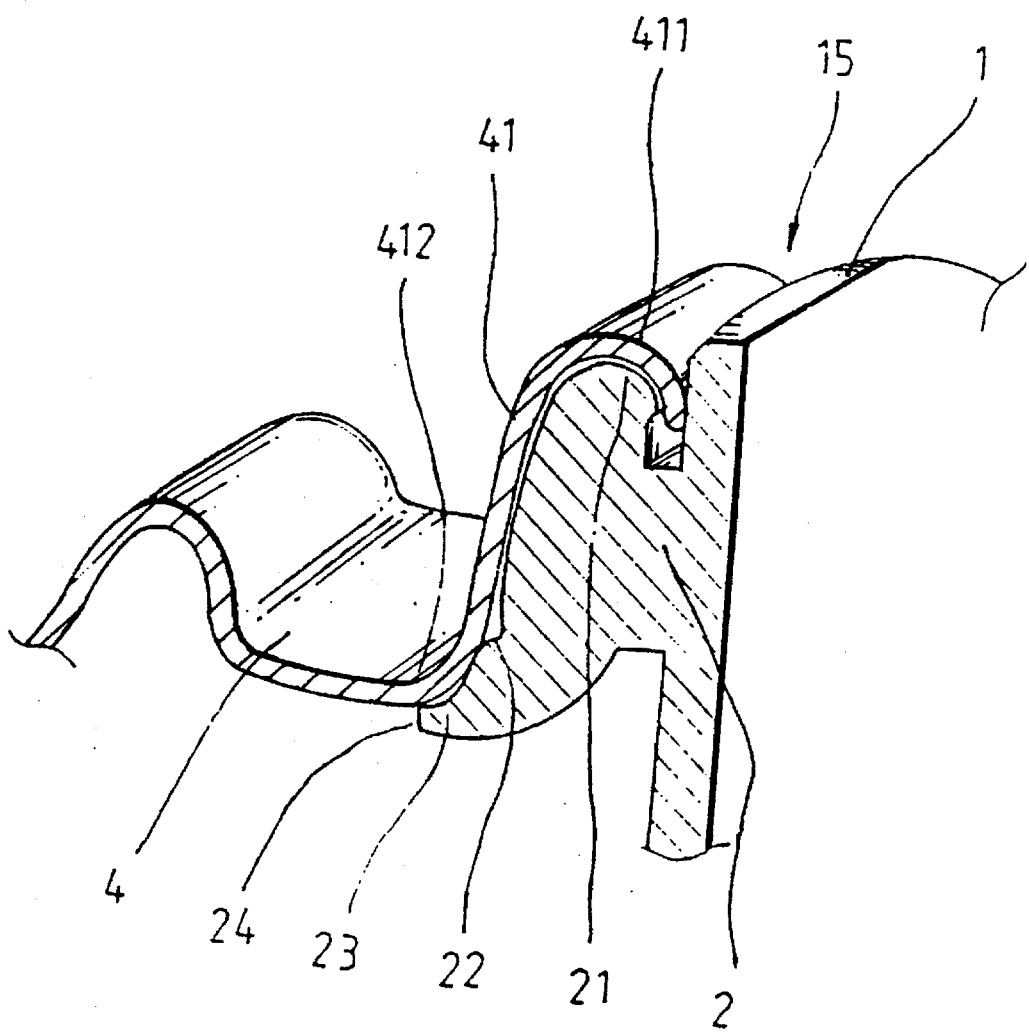
FIG. 4 is a cutaway view showing the connection between the wheel and one locating block of the wheel cover according to the present invention.

Referring to FIG. 4 and FIG. 2 again, the locating blocks 2 are respectively raised from the inner side and disposed behind the sliding grooves 15. Each locating block 2 comprises a smoothly curved locating portion 21 at one end fitting over the inner side 411 of the recessed wall portion 41, a sloping wall portion 22 spaced from the locating portion 21, a shoulder portion 24, and a coupling portion 23 connected between the sloping wall portion 22 and the shoulder portion 24 and fitting over the bottom side 412 of the recessed wall portion 41. Therefore, when the wheel cover 1 is attached to the wheel 4, the sloping wall portions 22, coupling portions 23 and shoulder portions 24 of the locating blocks 2 fit the curvature of the bottom side 412 of the recessed wall portion 41, permitting the wheel 4 and wheel cover 1 to be firmly fastened together by the clamps 3. Each locating block 2 further comprises a sloping bottom wall portion 111 spaced above the respective receiving chamber 16, and a beveled tail 112 extended from the sloping bottom wall portion 111.

Figure 3:
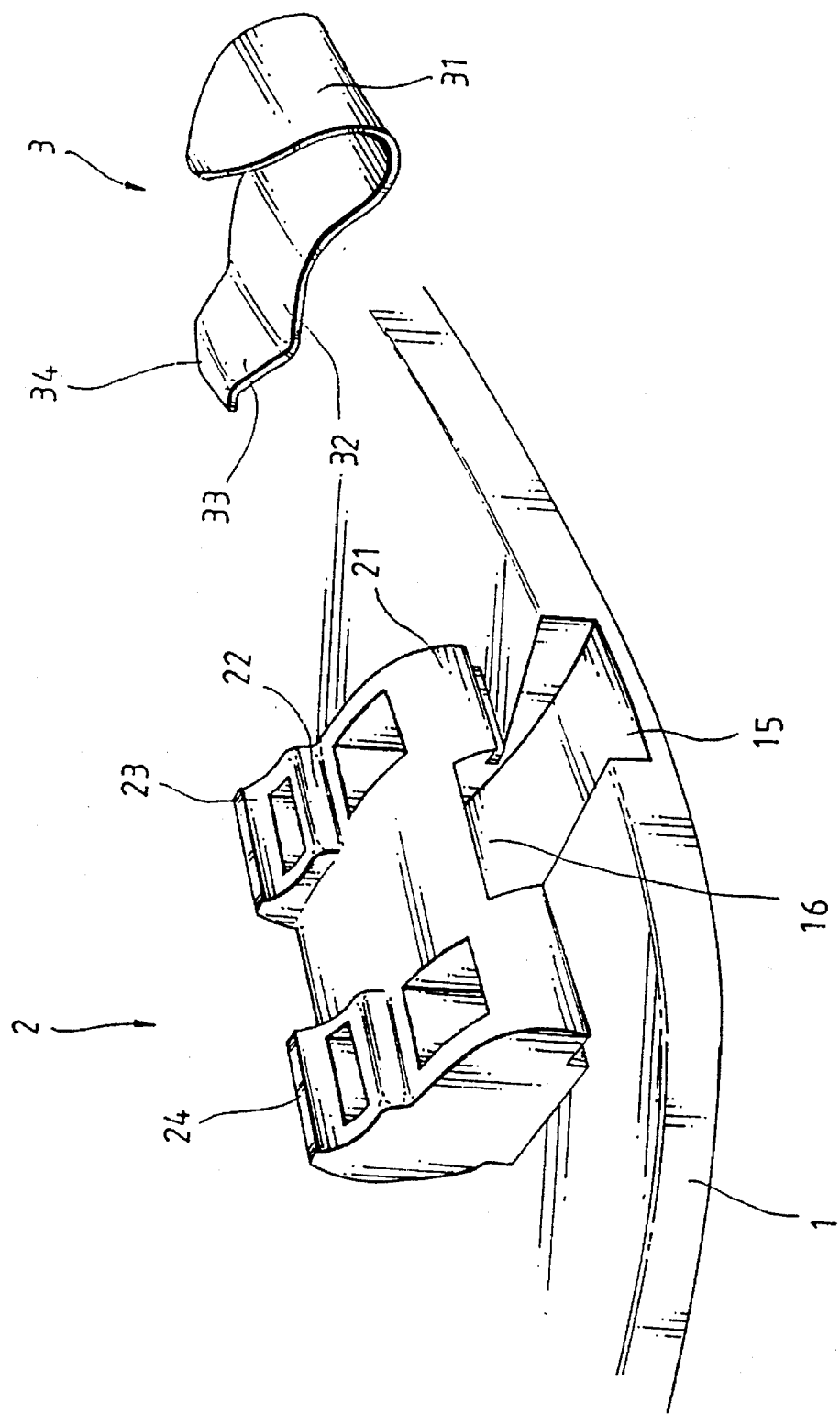
FIG. 3 is a partial view in an enlarged scale of the wheel assembly shown in FIG. 1, showing the structure of a clamp and its position relative to one locating block on the wheel cover.
Figure 5:
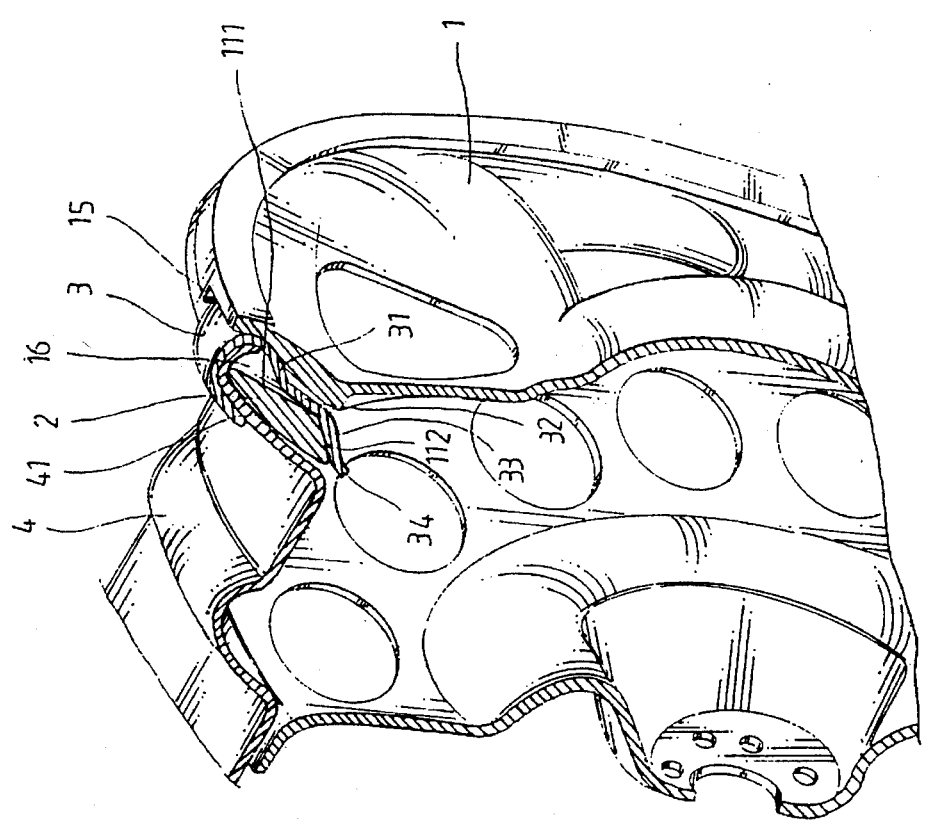
FIG. 5 is a cutaway view of the wheel assembly of the present invention, showing the wheel and one locating block of the wheel cover fastened by one clamp.

Referring to FIG. 5 and FIGS. 1 and 3 again, the clamp 3 is made from a spring plate comprised of a hooked portion 31 at one end for hooking on the smoothly curved peripheral wall portion 42 of the wheel 4, a bend 33 with a flange 34 at an opposite end for fitting the beveled tail 112 of one locating block 2, and a curved body portion 32 connected between the hooked portion 31 and the bend 33 for inserting into one receiving chamber 16 and then fitting the sloping bottom wall portion 111 of the corresponding locating block 2.

The assembly process of the wheel assembly is outlined hereinafter with reference to FIG. 5 again. The wheel cover 1 is attached to the wheel 4, permitting the locating blocks 2 of the wheel cover 1 to be respectively attached to the recessed wall portion 41 of the wheel 4. Then, the clamps 3 are respectively fastened to the wheel cover 1 and the wheel 4 by inserting the flange 34, bend 33 and curved body portion 32 of each clamp 3 through the sliding grooves 15 into the receiving chambers 16 respectively, permitting the hooked portions 31 of the clamps 3 to be hooked on the smoothly curved peripheral wall portion 42 of the wheel 4. When the clamps 3 are installed, the bends 33 and curved body portions 32 of the clamps 3 respectively fit the beveled tails 112 and sloping bottom wall portions 111 of the locating blocks 2 respectively.

While only one embodiment of the present invention has been shown and described, it will be understood that various modifications and changes could be made without departing from the spirit and scope of the invention.

What is claimed is:

1. A wheel assembly comprising a wheel, fastening means, and a wheel cover fastened to said wheel by said fastening means, wherein:

said wheel cover includes an inner side, a circular shape, a plurality of sliding grooves radially disposed at the inner side, and a plurality of locating blocks raised from the inner side and respectively disposed adjacent to said sliding grooves, said locating blocks defining with the inner side of said wheel cover a respective receiving chamber in alignment with said sliding grooves to receive said fastening means;

said wheel has a recessed wall portion at an outer side, which receives said locating blocks, and a smoothly curved peripheral wall portion around said recessed wall portion for mounting said fastening means permitting said wheel cover to be fastened to said wheel by said fastening means; and said fastening means comprises a plurality of clamps, each of said plurality of clamps including a hook-shaped end on the smoothly curved peripheral wall portion of said wheel and an opposite end respectively inserted through said sliding grooves into said respective receiving chamber.

2. The wheel assembly of claim 1 wherein each locating block comprises one end and a smoothly curved locating portion at said one end fitting over an inner side of said recessed wall portion of said wheel.

3. The wheel assembly of claim 2 wherein said recessed wall portion of said wheel includes a bottom side, and wherein each locating block further comprises a sloping wall portion spaced from said locating portion, a shoulder portion, and a coupling portion connected between said slopping wall portion and said shoulder portion and fitting over said bottom side of said recessed wall portion of said wheel.

4. The wheel assembly of claim 3 wherein each locating block further comprises a sloping bottom wall portion spaced above the corresponding receiving chamber, and a beveled tail extended from said sloping bottom wall for supporting one clamp.

5. The wheel assembly of claim 1 wherein each clamp comprises a hooked portion at one end hooked on said smoothly curved peripheral wall portion of said wheel, a bend at an opposite end bearing against the beveled tail of one locating block, and a curved body portion connected between said hooked portion and received in one receiving chamber, the curved body portion bearing against the sloping bottom wall portion of one locating block.

6. The wheel assembly of claim 5 wherein the bend of each clamp has one end connected to the curved body portion of the respective clamp and an opposite end terminating in a flange turned in an angle.

* * * * *